United States Patent
Yang

(10) Patent No.: US 8,353,228 B2
(45) Date of Patent: Jan. 15, 2013

(54) LOCKABLE OR RELEASABLE BICYCLE WITH BIDIRECTIONAL INPUT AND ONE-WAY OUTPUT

(76) Inventor: Tai-Her Yang, Dzan-Hwa (TW)

(*) Notice: Subject to any disclaimer, the term of this patent is extended or adjusted under 35 U.S.C. 154(b) by 264 days.

(21) Appl. No.: 12/656,159

(22) Filed: Jan. 20, 2010

(65) Prior Publication Data
US 2011/0177902 A1    Jul. 21, 2011

(51) Int. Cl.
*F16H 3/10* (2006.01)
*F16H 3/44* (2006.01)
(52) U.S. Cl. .......................... 74/810.1; 475/12
(58) Field of Classification Search ............ 74/318, 74/319, 322, 325, 810.1; 475/12
See application file for complete search history.

(56) References Cited

U.S. PATENT DOCUMENTS

| | | | | |
|---|---|---|---|---|
| 5,895,336 A * | 4/1999 | Yoo | | 475/318 |
| 5,954,614 A * | 9/1999 | Yoo | | 475/294 |
| 5,957,802 A * | 9/1999 | Yoo | | 475/294 |
| 5,970,822 A * | 10/1999 | Jung et al. | | 74/810.1 |
| 5,971,884 A * | 10/1999 | Yoo | | 475/298 |
| 6,045,475 A * | 4/2000 | Yoo | | 475/12 |
| 6,931,954 B2 * | 8/2005 | Jinbo | | 74/64 |

* cited by examiner

*Primary Examiner* — Sherry Estremsky
(74) *Attorney, Agent, or Firm* — Bacon & Thomas, PLLC

(57) ABSTRACT

The present invention relates to a lockable or releasable transmission with bidirectional input and one-way output, which is forward or reversely driven by human's foot for achieving the output at constant rotation direction to drive the load wheel group, and has the anti-locking function, through releasing the lockable or releasable mechanism, when reverse drive caused by back move occurs at output terminal.

15 Claims, 5 Drawing Sheets

LOCKABLE OR RELEASABLE BICYCLE WITH BIDIRECTIONAL INPUT AND ONE-WAY OUTPUT

BACKGROUND OF THE INVENTION (a) Field of the Invention

The lockable or releasable bicycle with bidirectional input and one-way output of the present invention drives the input terminal of the human input device at forward or reverse dual rotary direction through human's foot, and then the output terminal of the human input device transmits the kinetic energy to the input terminal of the lockable or releasable transmission with bidirectional input and one-way output, and the output terminal of the lockable or releasable transmission with bidirectional input and one-way output produces constant rotary direction output to drive the load wheel group; and when the load wheel group moves back, the reverse drive caused by back move occurs at output terminal, through releasing the lockable or releasable mechanism, the lockable or releasable bicycle with bidirectional input and one-way output is prevented from locking.

The present invention is applied to pedal vehicle, or mixture of electric and pedal vehicles, or combination of electric and pedal vehicles, especially to a bicycle pedaling at bidirection and one-way moving driven.

(b) Description of the Prior Art

The rider on the conventional bicycle always pedals at constant direction, and the related muscles and joints are constantly used during the pedaling period, i.e. some muscles and joints of the rider's body are constantly used and stressed, and the others are constantly unused and released, overall, the human load is uneven, the rider is easily fatigued, and exercise injury is caused by frequently pedaling.

SUMMARY OF THE INVENTION

The lockable or releasable bicycle with bidirectional input and one-way output of the present invention is a human input device with dual rotary direction input, in which the output terminal thereof connects to the input terminal of a lockable or releasable transmission with bidirectional input and one-way output, the constant rotary direction output through the output terminal of the lockable or releasable transmission with bidirectional input and one-way output to drive a load wheel group; the rider chooses the direction of driving input, and makes constant rotary direction output with same or different speed ratio at different driven input direction to drive the load wheel group, and when the load wheel group moves backwards, i.e. reverse drive caused by back move occurs at the output terminal, through releasing the lockable or releasable mechanism, the lockable or releasable bicycle with bidirectional input and one-way output is prevented from locking.

DESCRIPTION OF MAIN COMPONENT SYMBOLS

Figure 1:
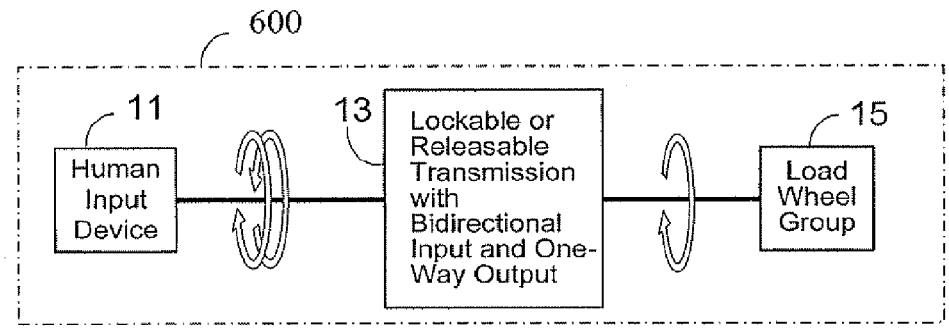
FIG. 1 is a schematic view showing the basic component blocks of the lockable or releasable bicycle with bidirectional input and one-way output, according to the present invention.

11: Human input device
12: Bugtriebwerk
13: Lockable or releasable transmission with bidirectional input and one-way output
14: Posterior transmission
15: Load wheel group
90: Lockable or releasable mechanism
102: Sun wheel
103: Planetary wheel
104: Outer wheel
200: Planetary wheel support arm ring frame
201: Planetary wheel shaft
301, 302, 303, 305: One-way transmission
400: Epicyclic gear support arm ring frame
401: Epicyclic gear shaft
402: Inward oblique wheel
403: Epicyclic gear
404: Outward oblique wheel
500: Shell of gear train
600: Machine body
602、603、605、606、615、616、617: Driving wheel
604、618: Revolving shaft
607: Driving belt
2000: Input shaft
3000: Output shaft

DETAILED DESCRIPTION OF THE PREFERRED EMBODIMENTS

The lockable or releasable bicycle with bidirectional input and one-way output of the present invention drives the input terminal of the human input device at forward or reverse dual rotary direction through human's foot, and then the output terminal of the human input device transmits the kinetic energy to the input terminal of the lockable or releasable transmission with bidirectional input and one-way output, and the output terminal of the lockable or releasable transmission with bidirectional input and one-way output produces constant rotary direction output to drive the load wheel group, and further to drive the vehicle integrated at the load wheel group; the present invention is applied to pedal vehicles, or mixture of electric and pedal vehicles, or combination of electric and pedal vehicles, especially to a bicycle pedaling at bidirection and one-way moving driven, for human's lower limbs pedaling at bidirection to extend and change the muscle groups, thus achieving the following advantages:

(1) reducing the injured caused by some muscles and joints overused; and (2) employing or training the unused muscles and joints.

The present invention relates to a human input device with dual rotary direction input, in which the output terminal of the device is used to transmit the kinetic energy to the input terminal of the specific lockable or releasable transmission with bidirectional input and one-way output, and the output terminal of the lockable or releasable transmission with bidirectional input and one-way output produces constant rotary direction output to drive the load wheel group, and further to drive the vehicle integrated at the load wheel group; the rider selects the direction of pedal-driven input, and the lockable or releasable transmission with bidirectional input and one-way output with same or different speed ratio produces constant rotary direction output at different driven input direction; and when the load wheel group moves back, the reverse drive caused by back move occurs at output terminal, through releasing the lockable or releasable mechanism, the lockable or releasable bicycle with bidirectional input and one-way output is prevented from locking.

FIG. 1 is a schematic view showing the basic component blocks of the lockable or releasable bicycle with bidirectional input and one-way output, according to the present invention.

As shown in FIG. 1, which is a structural schematic view of the lockable or releasable bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel group with dual rotary direction, or a handle, a hand shank, and a driving wheel group with dual rotary direction, i.e. dual rotary direction mechanism by human power; in which the kinetic energy of the first driving rotary direction and the input kinetic energy of the second driving rotary direction derived from human's foot driving the input terminal of the human input device 11;

the first driving rotary direction and the second driving rotary direction are reverse;

lockable or releasable transmission with bidirectional input and one-way output 13: which is driven by different rotary direction kinetic energy from the human input device 11, and outputs constant rotary direction kinetic energy; and the lockable or releasable bicycle with bidirectional input and one-way output has the anti-locking function, through releasing the lockable or releasable mechanism 90, when reverse drive caused by back move occurs at the output terminal; in which the transmission components within the lockable or releasable transmission with bidirectional input and one-way output 13 are constituted by one or more of the followings integrated with the lockable or releasable mechanism 90, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and when the lockable or releasable transmission with bidirectional input and one-way output 13 is driven through being input the first driving rotary direction and the second driving rotary direction, which are different rotary directions, the speed ratio between the input terminal and the output terminal with constant rotary direction is same, different, or variable; in which the main transmission structure and operational features of the lockable or releasable transmission with bidirectional input and one-way output 13 are as following:

the first rotary direction and the second rotary direction are reverse;

if the input terminal is driven by the first rotary direction, the first rotary direction output is produced through the first gear train driving the output terminal;

if the input terminal is driven by the second rotary direction, the first rotary direction output is produced through the second gear train driving the output terminal;

an one-way transmission is installed between the first gear train and the second gear train to avoid the interference from the second gear train when the first gear train is used to be the first rotary direction input and produces the first rotary direction output;

an one-way transmission is installed between the second gear train and the first gear train to avoid the interference from the first gear train when the second gear train is used to be the second rotary direction input and produces the first rotary direction output;

in the gear train structure with dual rotary direction input and same rotary direction output of the lockable or releasable transmission with bidirectional input and one-way output 13, the radial or axial lockable or releasable mechanism 90 is installed at one or more of the following positions, including: between the machine body and the rotable shell of the gear train with bidirectional input and one-way output; or between the fixed shell and the rotating parts of the gear train with bidirectional input and one-way output; thus when reverse drive caused by back move occurs at the output terminal, through releasing the lockable or releasable mechanism 90, the gear train structure with dual rotary direction input and same rotary direction output is prevented from rigid lock status;

lockable or releasable mechanism 90: related to a mechanism driven to be locked or released by human power, or machine power, or aerodynamic force, or fluid power, or electromagnetic force; and load wheel group 15: directly driven by the output terminal of the lockable or releasable transmission with bidirectional input and one-way output 13, and further driving a vehicle integrated with the load wheel group 15; in which for the lockable or releasable bicycle with bidirectional input and one-way output, if it is driven through the human input device 11 by human's foot at the first driving rotary direction, or at the second rotary direction with different rotary direction from the first driving rotary direction, the kinetic energy output from the output terminal of the human input device 11 is transmitted to the input terminal of the lockable or releasable transmission with bidirectional input and one-way output 13 via the additionally installed bugtriebwerk 12, and the output terminal of the lockable or releasable transmission with bidirectional input and one-way output 13 outputs kinetic energy with constant rotary direction, to drive the load wheel group 15, and to further drive a vehicle integrated with the load wheel group 15.

Figure 2:
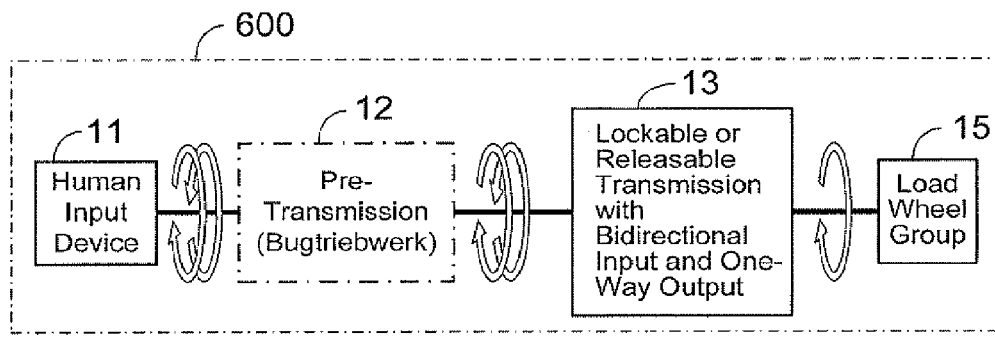
FIG. 2 is a schematic view showing the driving device component blocks, in which a bugtriebwerk 12 is additionally installed between a human input device 11 and a lockable or releasable transmission with bidirectional input and one-way output 13 in FIG. 1.

FIG. 2 is a schematic view showing the driving device component blocks, in which the bugtriebwerk 12 is additionally installed between the human input device 11 and the lockable or releasable transmission with bidirectional input and one-way output 13 in FIG. 1.

As shown in FIG. 2, which is a structural schematic view of the lockable or releasable bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel group with dual rotary direction, or a handle, a hand shank, and a driving wheel group with dual rotary direction, i.e. dual rotary direction mechanism by human power; in which the kinetic energy of the first driving rotary direction and the input kinetic energy of the second driving rotary direction derived from human's foot driving the input terminal of the human input device 11;

the first driving rotary direction and the second driving rotary direction are reverse;

bugtriebwerk 12: constituted by one or more of the following transmissions including various rotary transmission functional structures, such as gear type, belt type, or friction-type, with constant speed ratio or variable speed ratio; in which the bugtriebwerk 12 is driven by the human input device 11 and outputs rotary kinetic energy for driving the lockable or releasable transmission with bidirectional input and one-way output 13;

lockable or releasable transmission with bidirectional input and one-way output 13: which is driven by different rotary direction kinetic energy from the bugtriebwerk 12, and outputs constant rotary direction kinetic energy; and the lockable or releasable bicycle with bidirectional input and one-way output has the anti-locking function, through releasing the lockable or releasable mechanism 90, when reverse drive caused by back move occurs at the output terminal; in which the transmission components within the lockable or releasable transmission with bidirectional input and one-way output 13 are constituted by one or more of the followings integrated with the lockable or releasable mechanism 90, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and when the lockable or releasable transmission with bidirectional input and one-way output 13 is driven through being input the first driving rotary direction and the second driving rotary direction, which are different rotary directions, the speed ratio between the input terminal and the output terminal with constant rotary direction is same, different, or variable; in which the main transmission structure and operational features of the lockable or releasable transmission with bidirectional input and one-way output 13 are as following:

the first rotary direction and the second rotary direction are reverse;

if the input terminal is driven by the first rotary direction, the first rotary direction output is produced through the first gear train driving the output terminal;

if the input terminal is driven by the second rotary direction, the first rotary direction output is produced through the second gear train driving the output terminal;

an one-way transmission is installed between the first gear train and the second gear train to avoid the interference from the second gear train when the first gear train is used to be the first rotary direction input and produces the first rotary direction output;

an one-way transmission is installed between the second gear train and the first gear train to avoid the interference from the first gear train when the second gear train is used to be the second rotary direction input and produces the first rotary direction output;

in the gear train structure with dual rotary direction input and same rotary direction output of the lockable or releasable transmission with bidirectional input and one-way output 13, the radial or axial lockable or releasable mechanism 90 is installed at one or more of the following positions, including: between the machine body and the rotable shell of the gear train with bidirectional input and one-way output; or between the fixed shell and the rotating parts of the gear train with bidirectional input and one-way output; thus when reverse drive caused by back move occurs at the output terminal, through releasing the lockable or releasable mechanism 90, the gear train structure with dual rotary direction input and same rotary direction output is prevented from rigid lock status;

lockable or releasable mechanism 90: related to a mechanism driven to be locked or released by human power, or machine power, or aerodynamic force, or fluid power, or electromagnetic force; and load wheel group 15: directly driven by the output terminal of the lockable or releasable transmission with bidirectional input and one-way output 13, and further driving a vehicle integrated with the load wheel group 15; in which for the lockable or releasable bicycle with bidirectional input and one-way output, the kinetic energy output from the output terminal of the human input device 11, which is forward or reversely driven by human's foot, is transmitted to the lockable or releasable transmission with bidirectional input and one-way output 13, and the output terminal of the lockable or releasable transmission with bidirectional input and one-way output 13 outputs kinetic energy with constant rotary direction, to drive the load wheel group 15 via the additionally installed posterior transmission 14, and to further drive a vehicle integrated with the load wheel group 15.

Figure 3:
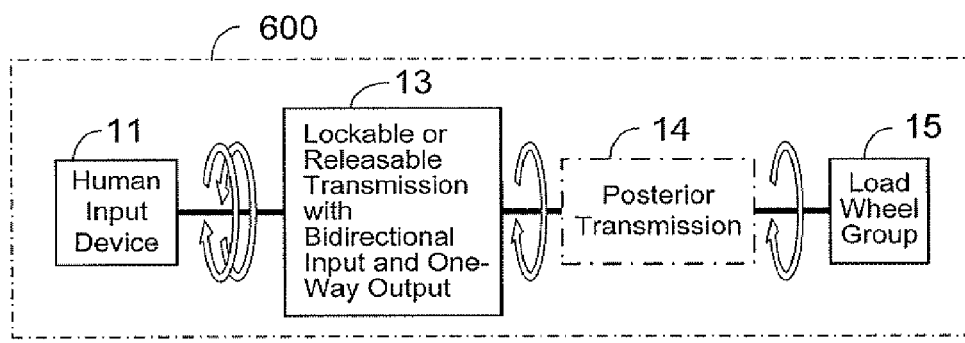
FIG. 3 is a schematic view showing the driving device component blocks, in which a posterior transmission 14 is additionally installed between the lockable or releasable transmission with bidirectional input and one-way output 13 and a load wheel group 15 in FIG. 1.

FIG. 3 is a schematic view showing the driving device component blocks, in which a posterior transmission 14 is additionally installed between the lockable or releasable transmission with bidirectional input and one-way output 13 and a load wheel group 15 in FIG. 1.

As shown in FIG. 3, which is a structural schematic view of the lockable or releasable bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel group with dual rotary direction, or a handle, a hand shank, and a driving wheel group with dual rotary direction, i.e. dual rotary direction mechanism by human power; in which the kinetic energy of the first driving rotary direction and the input kinetic energy of the second driving rotary direction derived from human's foot driving the input terminal of the human input device 11;

the first driving rotary direction and the second driving rotary direction are reverse;

lockable or releasable transmission with bidirectional input and one-way output 13: which is driven by different rotary direction kinetic energy from the human input device 11 through the bugtriebwerk 12, and outputs constant rotary direction kinetic energy; and the lockable or releasable bicycle with bidirectional input and one-way output has the anti-locking function, through releasing the lockable or releasable mechanism 90, when reverse drive caused by back move occurs at the output terminal; in which the transmission components within the lockable or releasable transmission with bidirectional input and one-way output 13 are constituted by one or more of the followings integrated with the lockable or releasable mechanism 90, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and when the lockable or releasable transmission with bidirectional input and one-way output 13 is driven through being input the first driving rotary direction and the second driving rotary direction, which are different rotary directions, the speed ratio between the input terminal and the output terminal with constant rotary direction is same, different, or variable; in which the main transmission structure and operational features of the lockable or releasable transmission with bidirectional input and one-way output 13 are as following:

the first rotary direction and the second rotary direction are reverse;

if the input terminal is driven by the first rotary direction, the first rotary direction output is produced through the first gear train driving the output terminal;

if the input terminal is driven by the second rotary direction, the first rotary direction output is produced through the second gear train driving the output terminal;

an one-way transmission is installed between the first gear train and the second gear train to avoid the interference from the second gear train when the first gear train is used to be the first rotary direction input and produces the first rotary direction output;

an one-way transmission is installed between the second gear train and the first gear train to avoid the interference from the first gear train when the second gear train is used to be the second rotary direction input and produces the first rotary direction output;

in the gear train structure with dual rotary direction input and same rotary direction output of the lockable or releasable transmission with bidirectional input and one-way output 13, the radial or axial lockable or releasable mechanism 90 is installed at one or more of the following positions, including: between the machine body and the rotable shell of the gear train with bidirectional input and one-way output; or between the fixed shell and the rotating parts of the gear train with bidirectional input and one-way output; thus when reverse drive caused by back move occurs at the output terminal, through releasing the lockable or releasable mechanism 90, the gear train structure with dual rotary direction input and same rotary direction output is prevented from rigid lock status;

lockable or releasable mechanism 90: related to a mechanism driven to be locked or released by human power, or machine power, or aerodynamic force, or fluid power, or electromagnetic force;

posterior transmission 14: constituted by one or more of the following transmissions including various rotary transmission functional structures, such as gear type, belt type, or friction-type, with constant speed ratio or variable speed ratio, for being driven by the lockable or releasable transmission with bidirectional input and one-way output 13, and the output terminal is used to drive the load wheel group 15; and load wheel group 15: directly driven by the output terminal of the posterior transmission 14, and further driving a vehicle integrated with the load wheel group 15, in which for the lockable or releasable bicycle with bidirectional input and one-way output, which drives the human input device 11 through forward or reverse rotation by human's foot, the output terminal outputs rotary kinetic energy transmitted to the input terminal of the lockable or releasable transmission with bidirectional input and one-way output 13 through the additionally installed bugtriebwerk 12, and the output terminal of the lockable or releasable transmission with bidirectional input and one-way output 13 outputs constant rotary direction output, to drive the load wheel group 15 through the additionally installed posterior transmission 14, and to further drive a vehicle integrated with the load wheel group 15.

Figure 4:
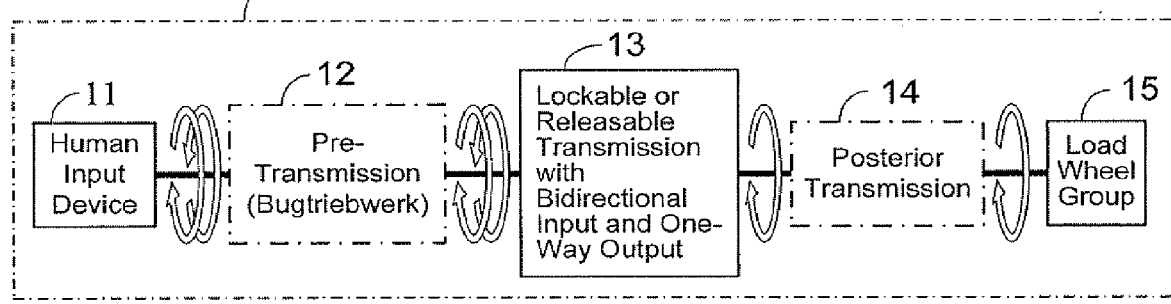
FIG. 4 is a schematic view showing the driving device component blocks, in which the bugtriebwerk 12 is additionally installed between the human input device 11 and the lockable or releasable transmission with bidirectional input and one-way output 13, and the posterior transmission is additionally installed between the lockable or releasable transmission with bidirectional input and one-way output 13 and the load wheel group 15 in FIG. 1.

FIG. 4 is a schematic view showing the driving device component blocks, in which the bugtriebwerk 12 is additionally installed between the human input device 11 and the lockable or releasable transmission with bidirectional input and one-way output 13, and the posterior transmission is additionally installed between the lockable or releasable transmission with bidirectional input and one-way output 13 and the load wheel group 15 in FIG. 1.

As shown in FIG. 4, which is a structural schematic view of the lockable or releasable bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel group with dual rotary direction, or a handle, a hand shank, and a driving wheel group with dual rotary direction, i.e. dual rotary direction mechanism by human power; in which the kinetic energy of the first driving rotary direction and the input kinetic energy of the second driving rotary direction derived from human's foot driving the input terminal of the human input device 11;

the first driving rotary direction and the second driving rotary direction are reverse;

bugtriebwerk 12: constituted by one or more of the following transmissions including various rotary transmission functional structures, such as gear type, belt type, or friction-type, with constant speed ratio or variable speed ratio; in which the bugtriebwerk 12 is driven by the human input device 11 and outputs rotary kinetic energy for driving the lockable or releasable transmission with bidirectional input and one-way output 13;

lockable or releasable transmission with bidirectional input and one-way output 13: which is driven by different rotary direction kinetic energy from the bugtriebwerk 12, and outputs constant rotary direction kinetic energy; and the lockable or releasable bicycle with bidirectional input and one-way output has the anti-locking function, through releasing the lockable or releasable mechanism 90, when reverse drive caused by back move occurs at the output terminal; in which the transmission components within the lockable or releasable transmission with bidirectional input and one-way output 13 are constituted by one or more of the followings integrated with the lockable or releasable mechanism 90, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and when the lockable or releasable transmission with bidirectional input and one-way output 13 is driven through being input the first driving rotary direction and the second driving rotary direction, which are different rotary directions, the speed ratio between the input terminal and the output terminal with constant rotary direction is same, different, or variable; in which the main transmission structure and operational features of the lockable or releasable transmission with bidirectional input and one-way output 13 are as following:

the first rotary direction and the second rotary direction are reverse;

if the input terminal is driven by the first rotary direction, the first rotary direction output is produced through the first gear train driving the output terminal;

if the input terminal is driven by the second rotary direction, the first rotary direction output is produced through the second gear train driving the output terminal;

an one-way transmission is installed between the first gear train and the second gear train to avoid the interference from the second gear train when the first gear train is used to be the first rotary direction input and produces the first rotary direction output;

an one-way transmission is installed between the second gear train and the first gear train to avoid the interference from the first gear train when the second gear train is used to be the second rotary direction input and produces the first rotary direction output;

in the gear train structure with dual rotary direction input and same rotary direction output of the lockable or releasable transmission with bidirectional input and one-way output 13, the radial or axial lockable or releasable mechanism 90 is installed at one or more of the following positions, including: between the machine body and the rotable shell of the gear train with bidirectional input and one-way output; or between the fixed shell and the rotating parts of the gear train with bidirectional input and one-way output; thus when reverse drive caused by back move occurs at the output terminal, through releasing the lockable or releasable mechanism 90, the gear train structure with dual rotary direction input and same rotary direction output is prevented from rigid lock status;

lockable or releasable mechanism 90: related to a mechanism driven to be locked or released by human power, or machine power, or aerodynamic force, or fluid power, or electromagnetic force;

posterior transmission 14: constituted by one or more of the following transmissions including various rotary transmission functional structures, such as gear type, belt type, or friction-type, with constant speed ratio or variable speed ratio, for being driven by the lockable or releasable transmission with bidirectional input and one-way output 13, and the output terminal is used to drive the load wheel group 15; and load wheel group 15: directly driven by the output terminal of the posterior transmission 14, and further driving a vehicle integrated with the load wheel group 15.

For the lockable or releasable bicycle with bidirectional input and one-way output, not only the related components and machine body of the vehicle driven and the load wheel group are installed, but also the characterized in that is the function of locking or releasing the bidirection input and one-way output, and the components and operational features of the lockable or releasable transmission with bidirectional input and one-way output 13 are provided for describing the feasibility.

Figure 5:
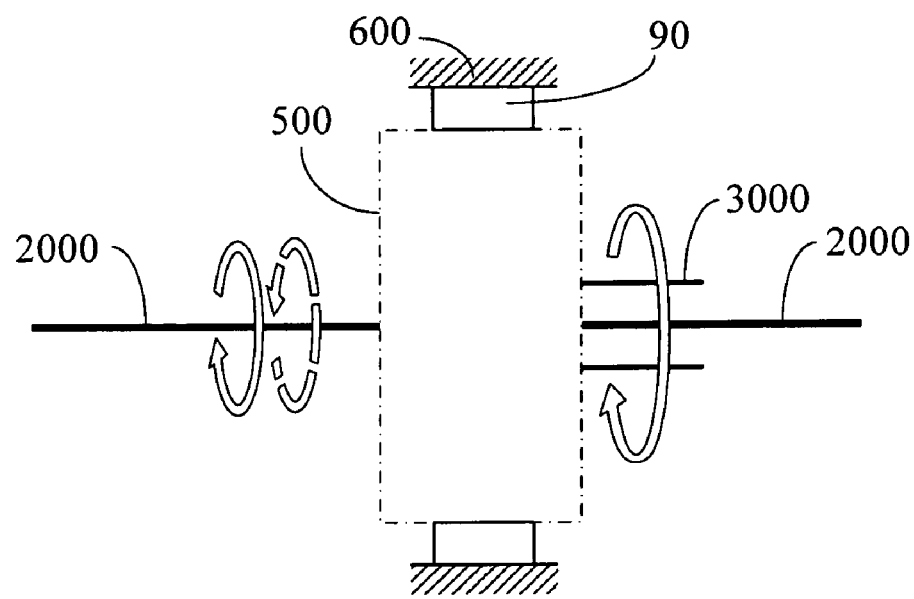
FIG. 5 is a schematic view showing the structural unit of the lockable or releasable transmission with bidirectional input and one-way output 13 installed in the lockable or releasable bicycle with bidirectional input and one-way output.

FIG. 5 is a structural unit schematic view, showing the installed lockable or releasable transmission with bidirectional input and one-way output 13 in the lockable or releasable bicycle with bidirectional input and one-way output, whose operational features are as following:

the first rotary direction and the second rotary direction are reverse;

if the input terminal is driven by the first rotary direction, the first rotary direction output is produced through the first gear train driving the output terminal;

if the input terminal is driven by the second rotary direction, the first rotary direction output is produced through the second gear train driving the output terminal;

an one-way transmission is installed between the first gear train and the second gear train to avoid the interference from the second gear train when the first gear train is used to be the first rotary direction input and produces the first rotary direction output;

an one-way transmission is installed between the second gear train and the first gear train to avoid the interference from the first gear train when the second gear train is used to be the second rotary direction input and produces the first rotary direction output;

by way of being installed the lockable or releasable mechanism 90 between the rotable shell of the gear train and the machine body, or between the fixed shell and the rotating parts of the gear train with bidirectional input and one-way output, when the output terminal of the gear train with bidirectional input and one-way output drives the input terminal at reverse rotary direction, through releasing the lockable or releasable mechanism 90, the gear train is prevented from rigid lock status.

Figure 6:
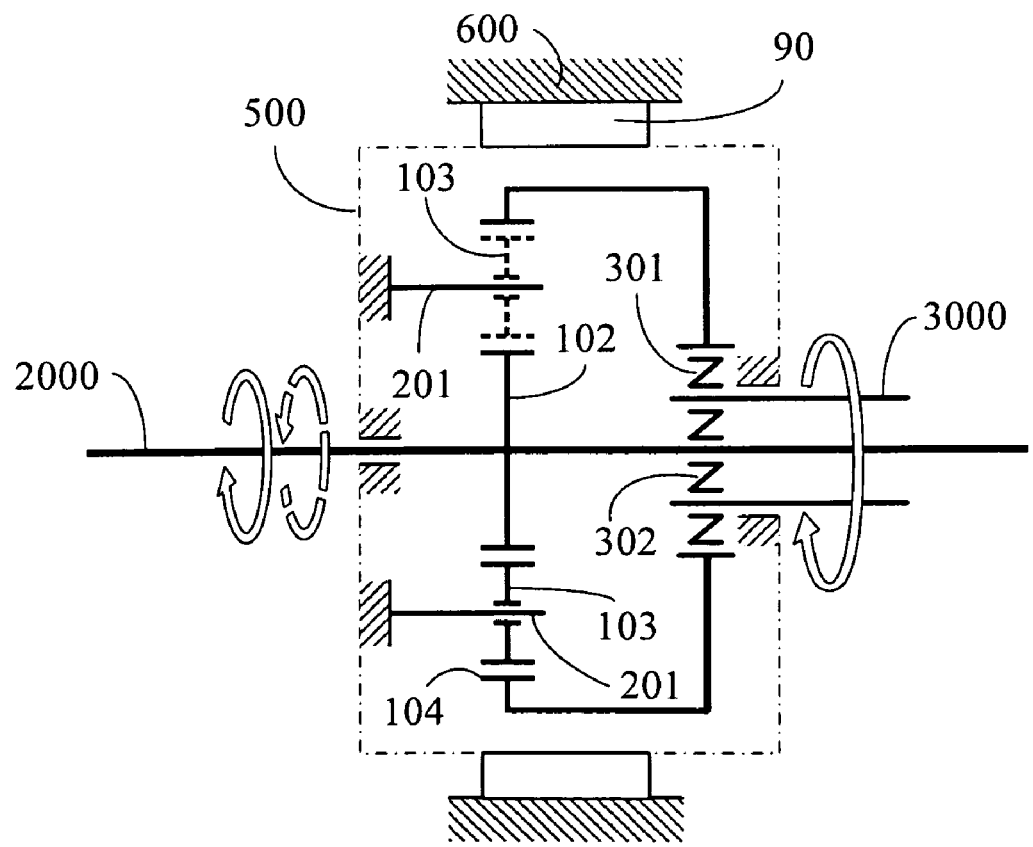
FIG. 6 is a schematic structural view showing the first embodiment of the lockable or releasable transmission with bidirectional input and one-way output 13.
Figure 7:
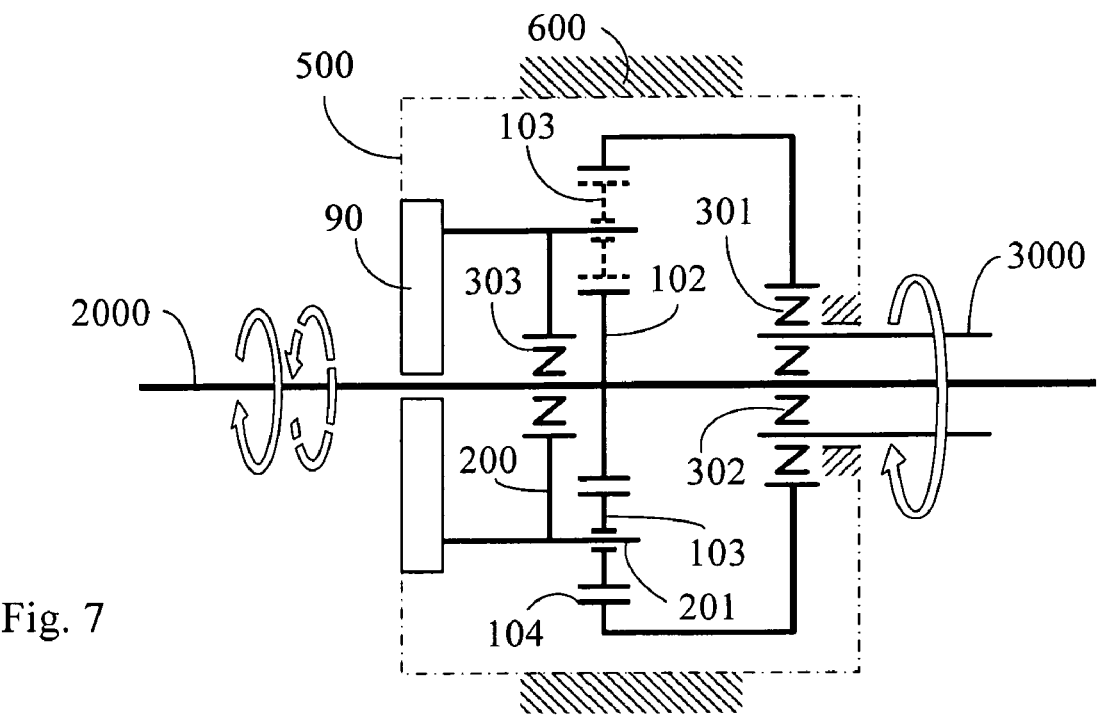
FIG. 7 is a schematic structural view showing the second embodiment of the lockable or releasable transmission with bidirectional input and one-way output 13.
Figure 8:
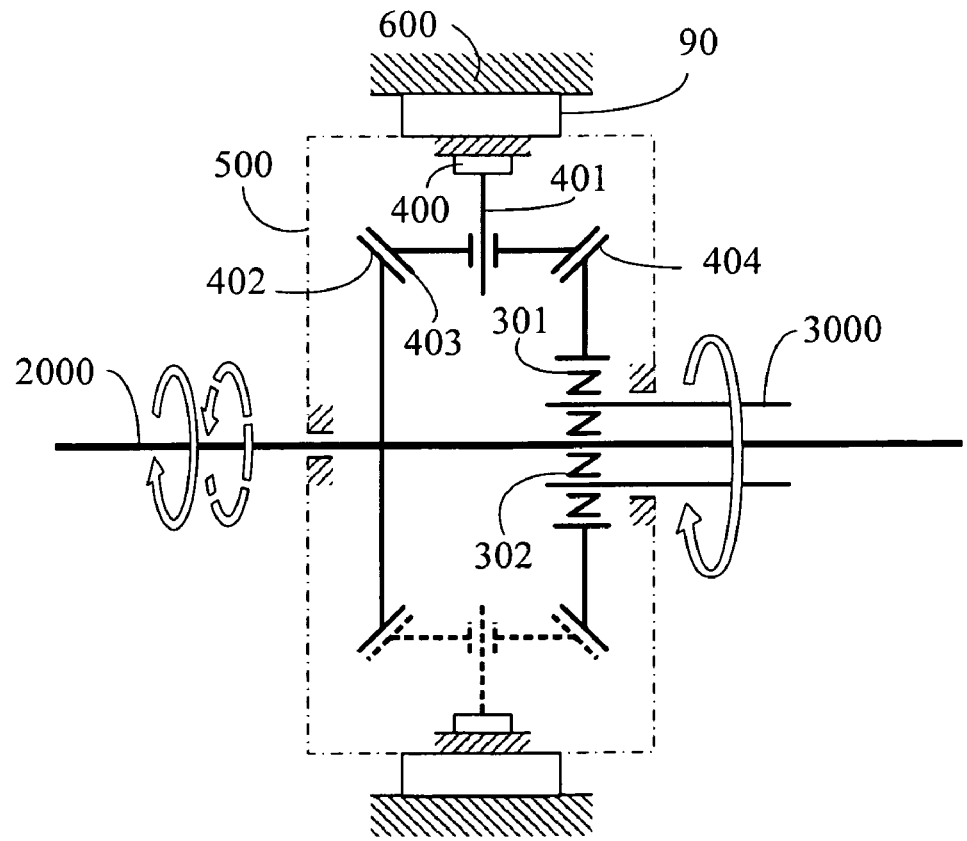
FIG. 8 is a schematic structural view showing the third embodiment of the lockable or releasable transmission with bidirectional input and one-way output 13.
Figure 9:
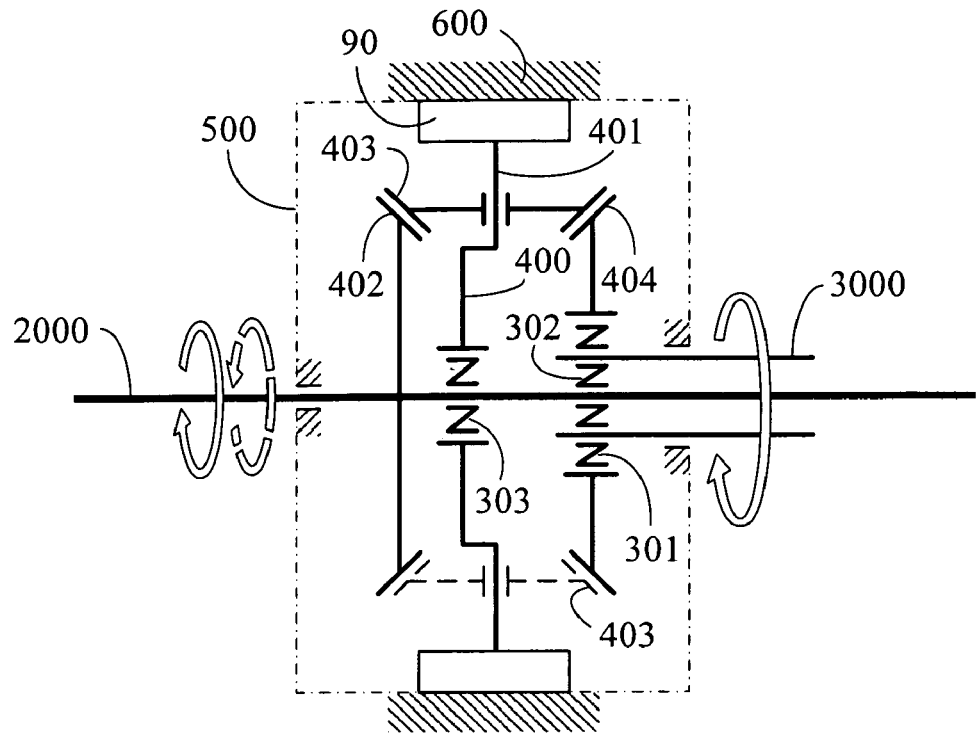
FIG. 9 is a schematic structural view showing the fourth embodiment of the lockable or releasable transmission with bidirectional input and one-way output 13.
Figure 10:
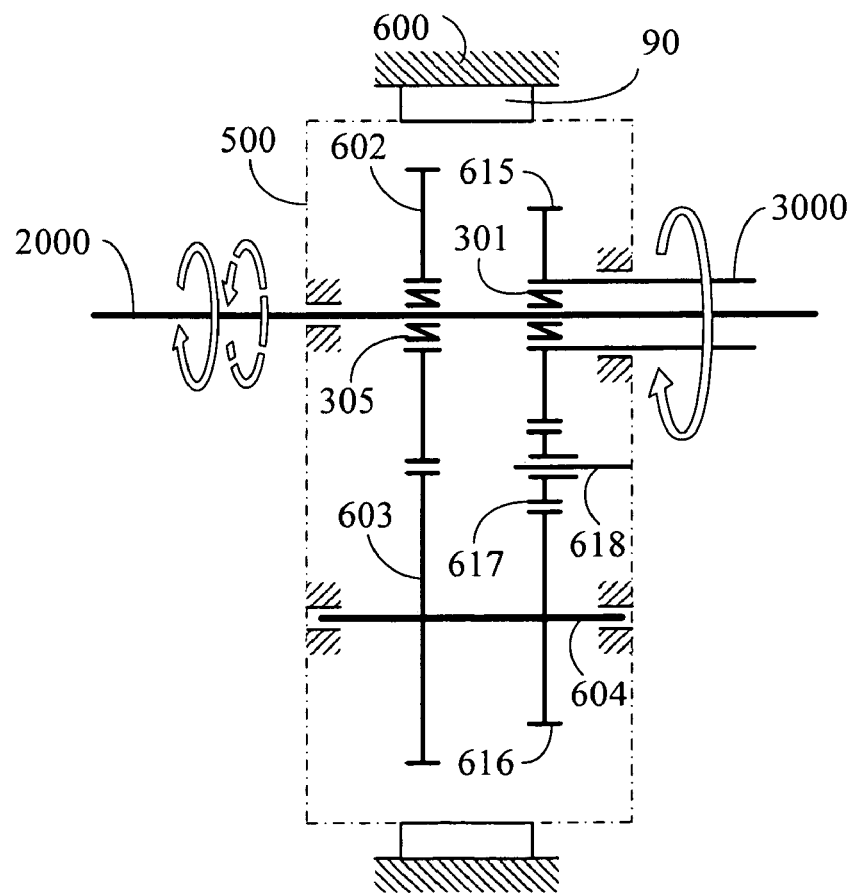
FIG. 10 is a schematic structural view showing the fifth embodiment of the lockable or releasable transmission with bidirectional input and one-way output 13.
Figure 11:
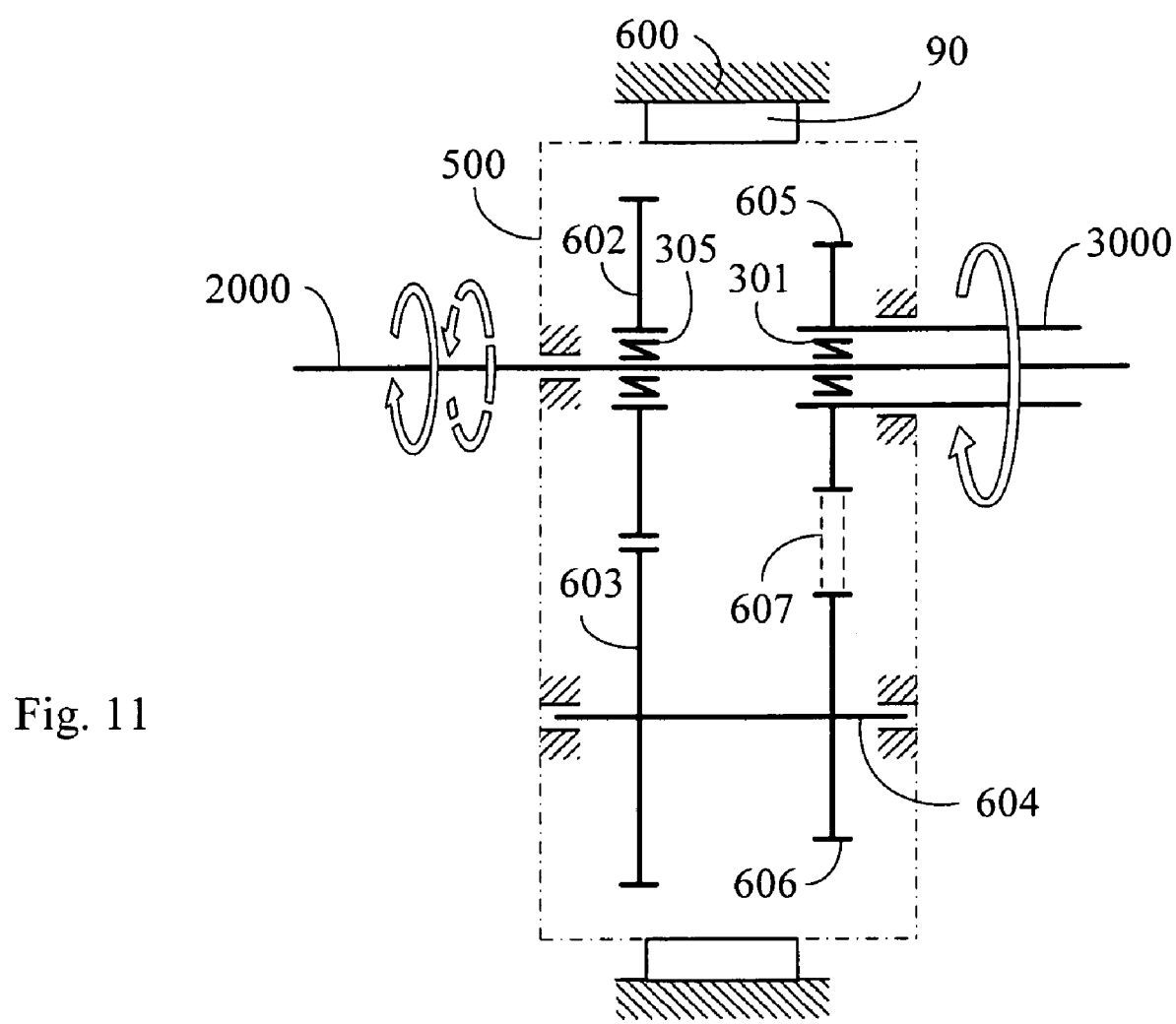
FIG. 11 is a schematic structural view showing the 6th embodiment of the lockable or releasable transmission with bidirectional input and one-way output 13.

In the lockable or releasable bicycle with bidirectional input and one-way output, the embodiments of the lockable or releasable transmission with bidirectional input and one-way output 13 used are shown as FIGS. 6 to 11, including:

A) as shown in FIGS. 6 to 7, which is constituted by a planetary gear train;

B) as shown in FIGS. 8 to 9, which is constituted by an epicyclic gear train; and C) as shown in FIGS. 10 to 11, which is integrated constituted by a transmission with different transmission rotary direction.

FIG. 6 is a schematic structural view showing the first embodiment of the lockable or releasable transmission with bidirectional input and one-way output 13.

As shown in FIG. 6, the lockable or releasable transmission with bidirectional input and one-way output 13 is constituted by a planetary gear train, and the input shaft and the output shaft are coaxial fitting, the main components including:

one end of an input shaft 2000 through installed at one side of a shell 500 of the gear train via bearing structure, another end of the input shaft 2000 through an output shaft 3000 via an one-way transmission 302, and a bearing installed between the output shaft 3000 and the shell 500 of the gear train;

lockable or releasable mechanism 90: related to a mechanism driven to be locked or released by human power, or machine power, or aerodynamic force, or fluid power, or electromagnetic force;

shell 500 of the gear train: machine parts installed for constituting the lockable or releasable gear train with bidirectional input and one-way output;

machine body 600: relatively static organization structure;

input shaft 2000 integrated at sun wheel 102;

a planetary wheel 103 installed between the outer wheel 104 and the sun wheel 102; the center of the planetary wheel 103 rotating at a planetary wheel shaft 201, and one end of the planetary wheel shaft 201 fixed at the shell 500 of the gear train;

the lockable or releasable mechanism 90 installed between the shell 500 of the gear train and the machine body 600;

an one-way transmission 301 installed between ring structure of the outer wheel 104 and the output shaft 3000;

by way of the above structure, the input shaft 2000 driven at the first rotary direction, through the one-way transmission 302 for driving the output shaft 3000 to produce the first rotary direction output to constitute the first gear train;

by way of the above structure, if the lockable or releasable mechanism 90 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second gear train; and when reverse drive caused by back move occurs at the output shaft 3000, through releasing the lockable or releasable mechanism 90, idling produced between the shell 500 of the gear train and the machine body 600, the first gear train and the second gear train are prevented from lock status.

FIG. 7 is a schematic structural view showing the second embodiment of the lockable or releasable transmission with bidirectional input and one-way output 13.

As shown in FIG. 7, the lockable or releasable transmission with bidirectional input and one-way output 13 is constituted by a planetary gear train, and the input shaft and the output shaft are coaxial fitting, the main components including:

one end of the input shaft 2000 through installed at one side of the shell 500 of the gear train via bearing structure, another end of the input shaft 2000 through the output shaft 3000 via the one-way transmission 302, and a bearing installed between the output shaft 3000 and the shell 500 of the gear train;

lockable or releasable mechanism 90: related to a mechanism driven to be locked or released by human power, or machine power, or aerodynamic force, or fluid power, or electromagnetic force;

shell 500 of the gear train: machine parts installed for constituting the lockable or releasable gear train with bidirectional input and one-way output;

machine body 600: relatively static organization structure;

input shaft 2000 integrated at sun wheel 102;

the planetary wheel 103 installed between the outer wheel 104 and the sun wheel 102; the center of the planetary wheel 103 rotating at the planetary wheel shaft 201; one end of the planetary wheel shaft 201 integrated at a planetary wheel support arm ring frame 200, and the planetary wheel support arm ring frame 200 through the one-way transmission 303 for rotating at the input shaft 2000 installed between the sun wheel 102 and the shell 500 of the gear train; and the lockable or releasable mechanism 90 installed between the planetary wheel support arm ring frame 200 and the shell 500 of the gear train;

the shell 500 of the gear train fixed at the machine body 600;

an one-way transmission 301 installed between ring structure of the outer wheel 104 and the output shaft 3000;

by way of the above structure, the input shaft 2000 driven at the first rotary direction, through the one-way transmission 302 for driving the output shaft 3000 to produce the first rotary direction output to constitute the first gear train;

by way of the above structure, if the lockable or releasable mechanism 90 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second gear train; and when reverse drive caused by back move occurs at the output shaft 3000, through releasing the lockable or releasable mechanism 90, idling produced between the shell 500 of the gear train and the planetary wheel support arm ring frame 200, the first gear train and the second gear train are prevented from lock status.

FIG. 8 is a schematic structural view showing the third embodiment of the lockable or releasable transmission with bidirectional input and one-way output 13.

As shown in FIG. 8, the lockable or releasable transmission with bidirectional input and one-way output 13 is constituted by an epicyclic gear train, and the input shaft and the output shaft are coaxial fitting, the main components including:

one end of the input shaft 2000 through installed at one side of the shell 500 of the gear train via bearing structure, another end of the input shaft 2000 through the output shaft 3000 via the one-way transmission 302, and a bearing installed between the output shaft 3000 and the shell 500 of the gear train;

lockable or releasable mechanism 90: related to a mechanism driven to be locked or released by human power, or machine power, or aerodynamic force, or fluid power, or electromagnetic force;

shell 500 of the gear train: machine parts installed for constituting the lockable or releasable gear train with bidirectional input and one-way output;

machine body 600: relatively static organization structure;

input shaft 2000 integrated at inward oblique wheel 402;

an epicyclic gear 403 installed between an outward oblique wheel 404 and the inward oblique wheel 402 the center of the epicyclic gear 403 rotating at an epicyclic gear shaft 401; one end of the epicyclic gear shaft 401 integrated at an epicyclic gear support arm ring frame 400, and the epicyclic gear support arm ring frame 400 fixed at the shell 500 of the ger train;

the lockable or releasable mechanism 90 installed between the shell 500 of the gear train and the machine body 600;

the one-way transmission 301 installed between ring structure of the outward oblique wheel 404 and the output shaft 3000;

by way of the above structure, the input shaft 2000 driven at the first rotary direction, through the one-way transmission 302 for driving the output shaft 3000 to produce the first rotary direction output to constitute the first gear train;

by way of the above structure, if the lockable or releasable mechanism 90 is locked, the input shaft 2000 is driven at the second rotary direction, through the inward oblique wheel 402 for further driving the epicyclic gear 403 and the outward oblique wheel 404, and through the outward oblique wheel 404 and the one-way transmission 301, for driving the output shaft 3000 to produce the first rotary direction output to constitute the second gear train; and when reverse drive caused by back move occurs at the output shaft 3000, through releasing the lockable or releasable mechanism 90, idling produced between the shell 500 of the gear train and the machine body 600, the first gear train and the second gear train are prevented from lock status.

FIG. 9 is a schematic structural view showing the fourth embodiment of the lockable or releasable transmission with bidirectional input and one-way output 13.

As showing in FIG. 9, the lockable or releasable transmission with bidirectional input and one-way output 13 is constituted by an epicyclic gear train, and the input shaft and the output shaft are coaxial fitting, the main components including:

one end of the input shaft 2000 through installed at one side of the shell 500 of the gear train via bearing structure, another end of the input shaft 2000 through the output shaft 3000 via the one-way transmission 302, and a bearing installed between the output shaft 3000 and the shell 500 of the gear train;

lockable or releasable mechanism 90: related to a mechanism driven to be locked or released by human power, or machine power, or aerodynamic force, or fluid power, or electromagnetic force;

shell 500 of the gear train: machine parts installed for constituting the lockable or releasable gear train with bidirectional input and one-way output;

machine body 600: relatively static organization structure;

input shaft 2000 integrated at inward oblique wheel 402;

the epicyclic gear 403 installed between the outward oblique wheel 404 and the inward oblique wheel 402; the center of the epicyclic gear 403 rotating at the epicyclic gear shaft 401; one end of the epicyclic gear shaft 401 integrated at the epicyclic gear support arm ring frame 400, and the epicyclic gear support arm ring frame 400 through the one-way transmission 303, for rotating at the input shaft 2000 installed between the inward oblique wheel 402 and the one-way transmission 302;

the lockable or releasable mechanism 90 installed between the epicyclic gear support arm ring frame 400 and the shell 500 of the gear train;

the shell 500 of the gear train fixed at the machine body 600;

the one-way transmission 301 installed between the outward oblique wheel 404 and the output shaft 3000;

by way of the above structure, the input shaft 2000 driven at the first rotary direction, through the one-way transmission 302 for driving the output shaft 3000 to produce the first rotary direction output to constitute the first gear train;

by way of the above structure, if the lockable or releasable mechanism 90 is locked, the input shaft 2000 is driven at the second rotary direction, through the inward oblique wheel 402 for further driving the epicyclic gear 403 and the outward oblique wheel 404, and through the outward oblique wheel 404 and the one-way transmission 301, for driving the output shaft 3000 to produce the first rotary direction output to constitute the second gear train; and when reverse drive caused by back move occurs at the output shaft 3000, through releasing the lockable or releasable mechanism 90, idling produced between the shell 500 of the gear train and the epicyclic gear support arm ring frame 400, the first gear train and the second gear train are prevented from lock status.

FIG. 10 is a schematic structural view showing the fifth embodiment of the lockable or releasable transmission with bidirectional input and one-way output 13.

As shown in FIG. 10, the lockable or releasable transmission with bidirectional input and one-way output 13 is integrated constituted by a transmission with different transmission rotary direction, and the input shaft and the output shaft are coaxial fitting, the main components including:

one end of the input shaft 2000 through installed at one side of the shell 500 of the gear train via bearing structure, another end of the input shaft 2000 through the output shaft 3000 via the one-way transmission 301; a bearing installed between the output shaft 3000 and the shell 500 of the gear train;

lockable or releasable mechanism 90: related to a mechanism driven to be locked or released by human power, or machine power, or aerodynamic force, or fluid power, or electromagnetic force;

shell 500 of the gear train: machine parts installed for constituting the lockable or releasable gear train with bidirectional input and one-way output;

machine body 600: relatively static organization structure;

input shaft 2000 through a driving wheel 602, and an one-way transmission 305 installed between the above both;

the driving wheel 602 and a driving wheel 603 transmitting at different rotary directions, the driving wheel 603 and a driving wheel 616 working together on a revolving shaft 604, and a bearing installed between the revolving shaft 604 and the shell 500 of the gear train;

driving wheel 616 rotating at a driving wheel 617 of a revolving shaft 618, and further driving a driving wheel 615 for constituting a driving wheel group with same rotary direction;

the revolving shaft 618 integrated at the shell 500 of the gear train;

the driving wheel 615 integrated at the output shaft 3000;

the lockable or releasable mechanism 90 installed between the shell 500 of the gear train and the machine body 600;

by way of the above structure, the input shaft 2000 driven at the first rotary direction, through the one-way transmission 301 for driving the output shaft 3000 to produce the first rotary direction output to constitute the first gear train;

by way of the above structure, if the lockable or releasable mechanism 90 is locked, the input shaft 2000 is driven at the second rotary direction, through the one-way transmission 305 for driving the driving wheel 602, then the driving wheel 602 driving the driving wheel 603 and the driving wheel 616, then the driving wheel 616 through the driving wheel 617 for further driving the driving wheel 615, and the driving wheel 615 driving the output shaft 3000 to produce the first rotary direction output to constitute the second gear train; and when reverse drive caused by back move occurs at the output shaft 3000, through releasing the lockable or releasable mechanism 90, idling produced between the shell 500 of the gear train and the machine body 600, the first gear train and the second gear train are prevented from lock status.

FIG. 11 is a schematic structural view showing the 6th embodiment of the lockable or releasable transmission with bidirectional input and one-way output 13.

As shown in FIG. 11, the lockable or releasable transmission with bidirectional input and one-way output 13 is integrated constituted by a transmission with different transmission rotary direction, and the input shaft and the output shaft are coaxial string set, the main components including:

one end of the input shaft 2000 through installed at one side of the shell 500 of the gear train via bearing structure, another end of the input shaft 2000 through the output shaft 3000 via the one-way transmission 301; a bearing installed between the output shaft 3000 and the shell 500 of the gear train; and the shell 500 of the gear train fixed at the machine body 600;

lockable or releasable mechanism 90: related to a mechanism driven to be locked or released by human power, or machine power, or aerodynamic force, or fluid power, or electromagnetic force;

shell 500 of the gear train: machine parts installed for constituting the lockable or releasable gear train with bidirectional input and one-way output;

machine body 600: relatively static organization structure;

input shaft 2000 through the driving wheel 602, and the one-way transmission 305 installed between the above both;

the driving wheel 602 and the driving wheel 603 transmitting at different rotary directions, the driving wheel 603 and the driving wheel 606 working together on the revolving shaft 604, and a bearing installed between the revolving shaft 604 and the shell 500 of the gear train;

the driving wheel 606 and the driving wheel 605 are driving wheel group with same rotary direction constituted through a belt wheel, a chain wheel, or an internal gear of the driving belt 607 for transmission;

the driving wheel 605 integrated at the output shaft 3000;

the lockable or releasable mechanism 90 installed between the shell 500 of the gear train and the machine body 600;

by way of the above structure, the input shaft 2000 driven at the first rotary direction, through the one-way transmission 301 for driving the output shaft 3000 to produce the first rotary direction output to constitute the first gear train;

by way of the above structure, if the lockable or releasable mechanism 90 is locked, the input shaft 2000 is driven at the second rotary direction, through the one-way transmission 305 for driving the driving wheel 602, then the driving wheel 602 driving the driving wheel 603 and the driving wheel 606, then the driving wheel 606 driving the driving wheel 605, for further driving the output shaft 3000 to produce the first rotary direction output to constitute the second gear train; and when reverse drive caused by back move occurs at the output shaft 3000, through releasing the lockable or releasable mechanism 90, idling produced between the shell 500 of the gear train and the machine body 600, the first gear train and the second gear train are prevented from lock status.

The invention claimed is:

1. A lockable or releasable, bi-directional input/one-way output device for a bicycle:
   a human input device (11) for converting forward, reverse, or reciprocating movements input by a human to an input terminal into a forward or reverse direction rotational output through an output terminal;
   a lockable or releasable transmission (13) having a bidirectional input to receive the forward or reverse direction rotational output from the output terminal of the human input device and convert the bidirectional input into a one-way output, thereby allowing a rider to achieve forward movement of the bicycle while selectively pedaling in either the forward direction or the rearward direction; and
   a lockable or releasable mechanism (90) arranged to release said one-way output of the lockable or releasable transmission (13) when a backward movement caused by an external force occurs at the one-way output of the lockable or releasable transmission (13), thereby allowing the bicycle to be moved without locking in a direction opposite the direction of the one-way output of the lockable or releasable transmission (13),
   wherein the lockable or releasable transmission (13) includes at least one gear train between the bi-directional input and the output of the lockable or releasable transmission (13), and
   wherein the lockable or releasable mechanism (90) is installed between a fixed machine body (600) and one of a shell (500) of the lockable or releasable transmission (13) and a shaft (201, 400, or 401) of a rotatable part (103 or 403) of the at least one gear train, or between the shell (500) and the shaft (201 or 401) of the rotatable part (103 or 403) of the at least one gear train, such that said lockable or releasable mechanism (90) fixes the shell or an axis of the rotatable part to enable transmission of power by said at least gear train from said bi-directional input to said one-way output, and releases said rotatable shell or respective axes of said rotatable parts to enable said backward movement at the output to be transmitted back to the rotatable shell or rotating parts without locking said lockable or releasable transmission (13).

2. A lockable or releasable, bi-directional input/one-way output device as claimed in claim 1, further comprising a load wheel group (15) directly driven by said lockable or releasable transmission.

3. A lockable or releasable, bi-directional input/one-way output device as claimed in claim 1, further comprising a pre-transmission (12) having a fixed or variable speed ratio, said pre-transmission (12) being connected between said human input device (11) and said lockable or releasable transmission (13).

4. A lockable or releasable, bi-directional input/one-way output device as claimed in claim 3, further comprising a posterior transmission (14) connected between the lockable or releasable transmission and a load wheel group (15).

5. A lockable or releasable, bi-directional input/one-way output device as claimed in claim 1, further comprising a posterior transmission (14) connected between the lockable or releasable transmission and a load wheel group (15).

6. A lockable or releasable, bi-directional input/one-way output device as claimed in claim 1, wherein said bi-directional input is an input shaft (2000) rotatably installed on a first side and/or a second side of the rotatable shell (500) and said one-way output is an output shaft (3000) that is coaxial with the input shaft and installed at the second side of the rotatable shell (500).

7. A lockable or releasable, bi-directional input/one-way output device as claimed in claim 6, further comprising a one-way transmission (302) connected between said input shaft (2000) and said output shaft (3000).

8. A lockable or releasable, bi-directional input/one-way output device as claimed in claim 7, wherein said at least one gear train includes a sun wheel (102) connected to and rotatable with said input shaft; at least one planetary wheel (103) coupled to the sun wheel (102) and rotatable about the shaft (201); a ring-shaped outer wheel (104) coupled to the at least one planetary wheel (103); and a one-way transmission (301) connected between the ring-shaped outer wheel (104) and the output shaft (3000).

9. A lockable or releasable, bi-directional input/one-way output device as claimed in claim 8, wherein the shell (500) is rotatable, the shaft (201) is fixed directly to the shell (500), and the lockable and releasable mechanism (90) is coupled between the machine body (600) and the shell (500), whereby when power is transmitted from the bi-directional input to the output of the lockable or releasable transmission, the rotatable shell is locked to the machine body (600) and does not rotate, and during said backward movement caused by an external force, said shell (500) is released from and rotatable relative to the machine body (600).

10. A lockable or releasable, bi-directional input/one-way output device as claimed in claim 8, wherein the shaft (201) extends from a planetary wheel support arm ring frame (200), the planetary wheel support arm ring frame (200) is coupled to the input shaft (2000) by a one-way transmission (303), and the lockable or releasable mechanism (90) is coupled between the rotatable shell (500) and the planetary wheel support arm ring frame (200), whereby during transmission of power from said bi-directional input to said one-way output, said planetary shell support arm ring frame (200) is locked to said shell (500) by said lockable or releasable mechanism, and during said backward movement caused by an external force, said planetary shell support arm ring frame (200) is released from said shell (500).

11. A lockable or releasable, bi-directional input/one-way output device as claimed in claim 7, wherein the at least one gear train includes an inward oblique wheel (402) integrated with the input shaft (2000); an epicyclic gear (403) rotatable about an epicyclic gear shaft (401) integrated with an epicyclic gear support arm ring frame (400) and coupled to the inward oblique wheel (402); an outward oblique wheel (404) coupled to the epicyclic gear (403); and a one-way transmission (301) coupled between the outward oblique wheel (404) and the output shaft (3000).

12. A lockable or releasable, bi-directional input/one-way output device as claimed in claim 11, wherein the epicyclic gear support arm ring frame (400) is fixed to the shell (500), and the lockable and releasable mechanism (90) is coupled between the machine body (600) and the shell (500), whereby when power is transmitted from the bi-directional input to the output of the lockable or releasable transmission, the rotatable shell is locked to the machine body (600) and does not rotate, and during said backward movement caused by an external force, said shell (500) is released from and rotatable relative to the machine body (600).

13. A lockable or releasable, bi-directional input/one-way output device as claimed in claim 11, wherein the shell (500) is fixed to the machine body (600), the lockable or releasable mechanism (90) is coupled between the shell (500) and the epicyclic gear shaft (401), and the epicyclic gear support arm ring frame (400) is fixed to the epicyclic gear shaft (401) and coupled to the input shaft (2000) by an epicyclic gear one-way transmission (303), whereby when power is transmitted from the bi-directional input to the output of the lockable or releasable transmission, the epicyclic gear shaft (401) and epicyclic gear support arm ring frame (400) are locked to the shell (500), and during backward movement caused by an external force, the epicyclic gear shaft (401) and epicyclic gear support arm ring frame (400) are released to rotate with respect to the shell (500).

14. A lockable or releasable, bi-directional input/one-way output device as claimed in claim 6, wherein the at least one gear train includes a first driving wheel (602) coupled to the input shaft by a first one-way transmission (305); a second driving wheel (603) coupled to the first driving wheel (602) and integral with a driving wheel shaft (604) mounted to the shell (500); a third driving wheel (616) integral with the driving wheel shaft (604); a fourth driving wheel (617) coupled to the third driving wheel (616) and mounted on a fourth driving wheel shaft (618) mounted on the shell (500); a fifth driving wheel (615) coupled to the fourth driving wheel (617), and a second one-way transmission (301) coupled between the fifth driving wheel (615) and the output shaft (3000), wherein the lockable and releasable mechanism (90) is coupled between the machine body (600) and the shell (500), and whereby when power is transmitted from the bi-directional input to the output of the lockable or releasable transmission, the rotatable shell is locked to the machine body (600) and does not rotate, and during said backward movement caused by an external force, said shell (500) is released from and rotatable relative to the machine body (600).

15. A lockable or releasable, bi-directional input/one-way output device as claimed in claim 6, wherein the at least one gear train includes a first driving wheel (602) coupled to the input shaft by a first one-way transmission (305); a second driving wheel (603) coupled to the first driving wheel (602) and integral with a driving wheel shaft (604) mounted to the shell (500); a third driving wheel (606) integral with the driving wheel shaft (604); a belt or chain driven transmission (607) coupled to the third driving wheel (606); a fourth driving wheel (605) coupled to the belt or chain driven transmission, and a second one-way transmission (301) coupled between the fifth driving wheel (615) and the output shaft (3000), wherein the lockable and releasable mechanism (90) is coupled between the machine body (600) and the shell (500), and whereby when power is transmitted from the bi-directional input to the output of the lockable or releasable transmission, the rotatable shell is locked to the machine body (600) and does not rotate, and during said backward movement caused by an external force, said shell (500) is released from and rotatable relative to the machine body (600).

* * * * *